A. T. DAWSON AND G. T. BUCKHAM.
DISTANT CONTROL OF MECHANISM SUCH AS GUN SIGHTS OR TURRETS.
APPLICATION FILED APR. 13, 1915.
1,304,269.
Patented May 20, 1919.
4 SHEETS—SHEET 2.
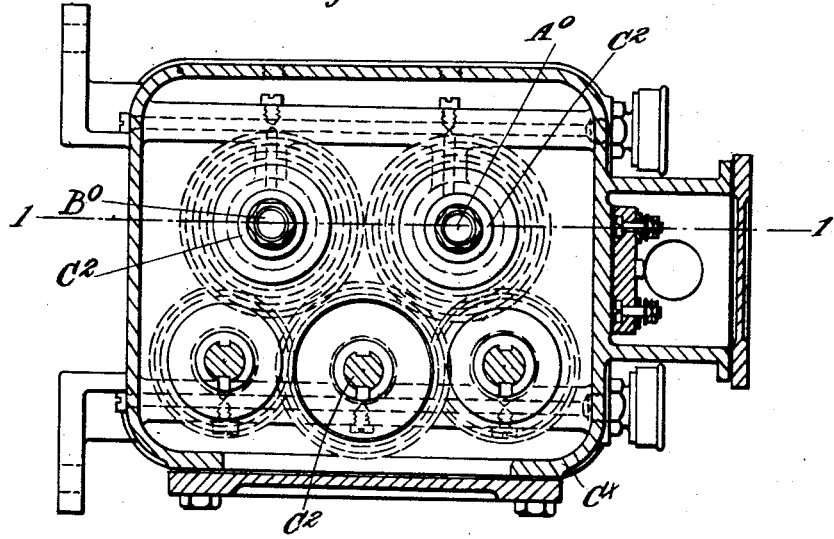
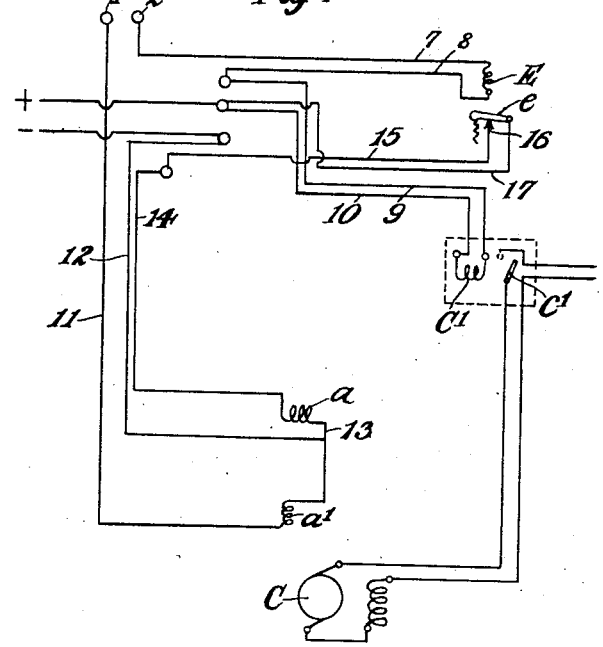
Inventors:
Arthur Trevor Dawson
& George Thomas Buckham
By Pennie Davis Marvin
Attys.

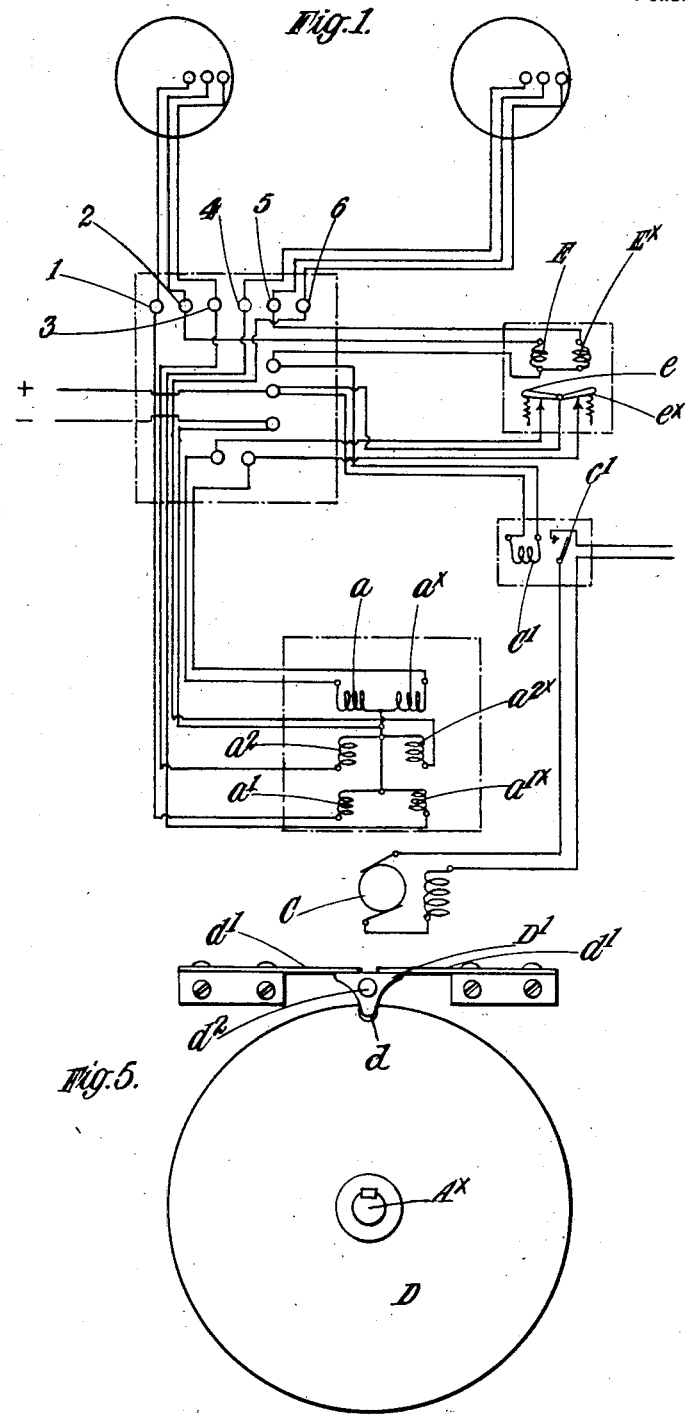

A. T. DAWSON AND G. T. BUCKHAM.
DISTANT CONTROL OF MECHANISM SUCH AS GUN SIGHTS OR TURRETS.
APPLICATION FILED APR. 13, 1915.
1,304,269.
Patented May 20, 1919.
4 SHEETS—SHEET 3.
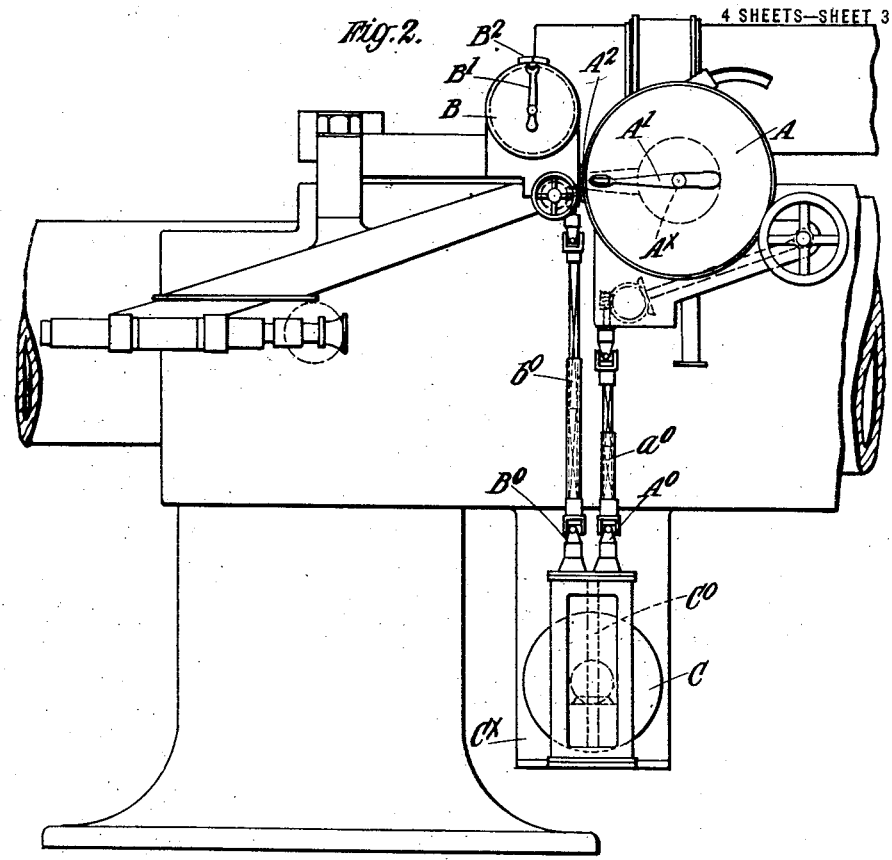
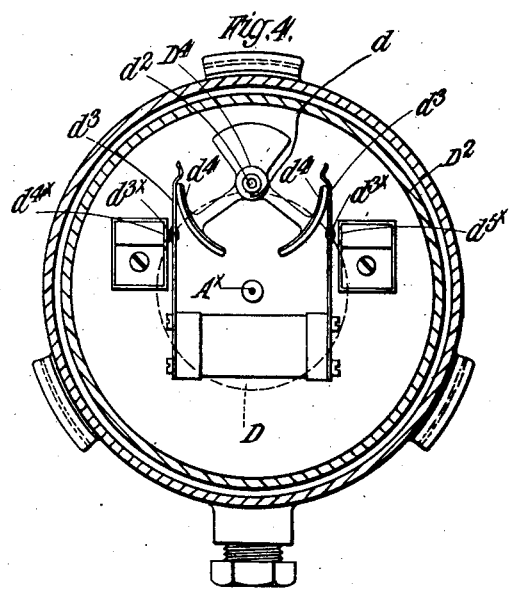
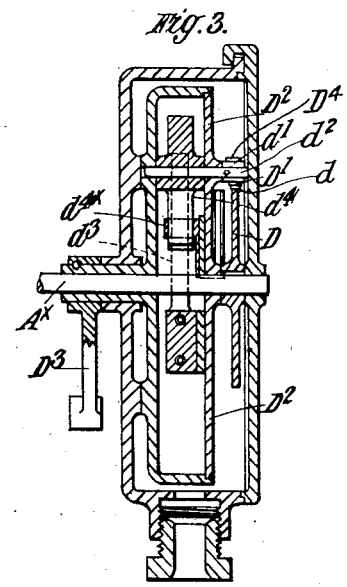
Inventors:
Arthur Trevor Dawson
& George Thomas Buckham
By
Attys.

A. T. DAWSON AND G. T. BUCKHAM.
DISTANT CONTROL OF MECHANISM SUCH AS GUN SIGHTS OR TURRETS.
APPLICATION FILED APR. 13, 1915.
1,304,269.
Patented May 20, 1919.
4 SHEETS—SHEET 4.
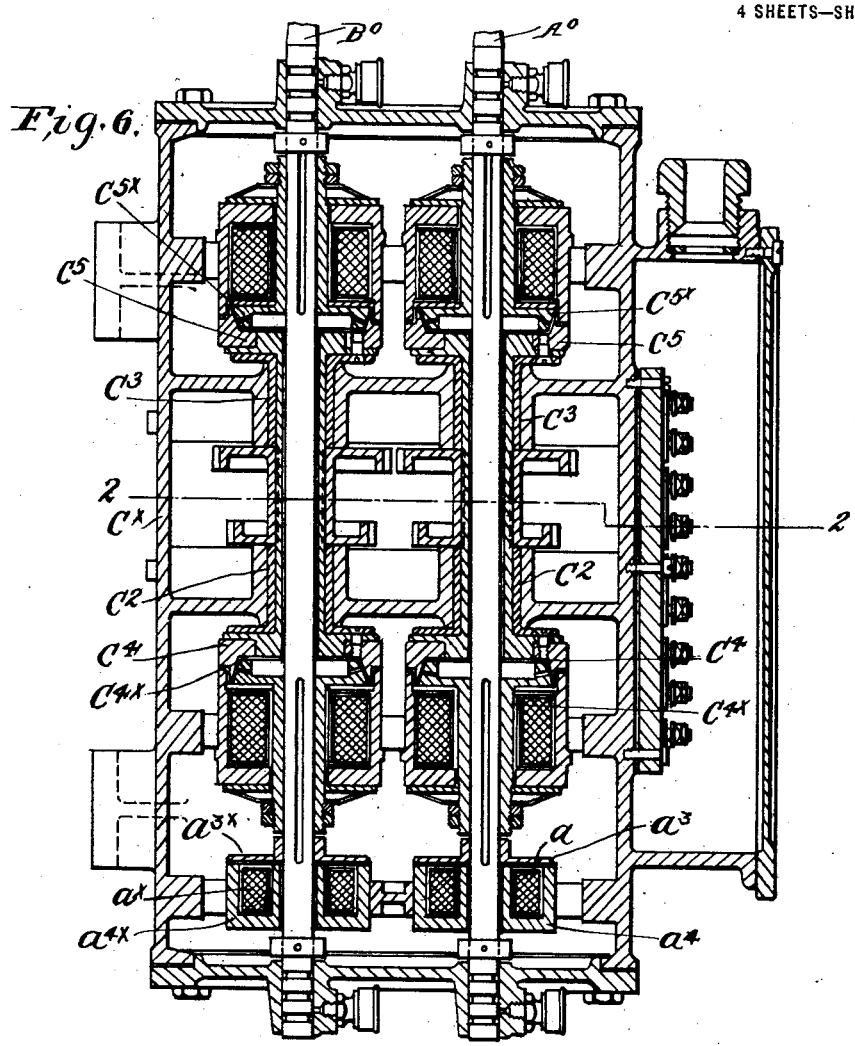
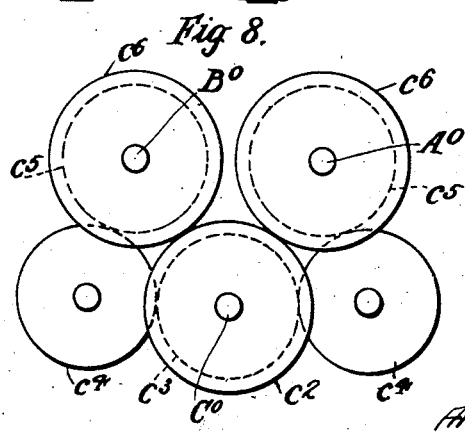

UNITED STATES PATENT OFFICE.

ARTHUR TREVOR DAWSON AND GEORGE THOMAS BUCKHAM, OF WESTMINSTER, LONDON, ENGLAND, ASSIGNORS TO VICKERS LIMITED, OF WESTMINSTER, ENGLAND.

DISTANT CONTROL OF MECHANISM SUCH AS GUN SIGHTS OR TURRETS.

1,304,269.  Specification of Letters Patent.  Patented May 20, 1919.

Application filed April 13, 1915. Serial No. 21,117.

*To all whom it may concern:*

Be it known that we, Sir ARTHUR TREVOR DAWSON, knight, and GEORGE THOMAS BUCKHAM, both subjects of the King of Great Britain, residing at Vickers House, Broadway, Westminster, in the county of London, England, have invented certain new and useful Improvements in the Distant Control of Mechanism Such as Gun Sights or Turrets, of which the following is a specification.

This invention relates to the distant control of mechanism such as gun sights and turrets in which a traveling pointer is actuated from a distance and, in the case of a gun sight, in accordance with any particular range or deflection, this pointer serving, when moved out of coincidence with its index mark, to cause a motor to move the sight and at the same time cause the index mark to follow the movements of the pointer (or to cause the pointer to return) until the index mark and the pointer resume their position of coincidence whereupon the motor ceases to operate the sight, the pointer and its index mark thus forming part of a hunting gear.

According to this invention we provide means whereby a motor automatically moves the sight or turret in response to the movements of the aforesaid traveling pointer in the direction determined by the displacement of the pointer and automatically ceases to move the sight or turret when the pointer and the index mark resume their position of coincidence in which condition the sight or turret is set to a position determined by the amount of angular movement that has been given to the pointer. The said motor is adapted to run only in one direction and to alone move the sight or turret, and operates through a switch and electro-magnetic clutch mechanism controlled from a distance through hunting gear. The said pointer and its index mark form part of a hunting gear comprising mechanically actuated electric switch mechanism controlling circuits which mechanism when the pointer moves relatively to the index mark brings into operation one or other of two electro-magnetic clutches to enable the aforesaid motor to move the sight or turret in the required direction, and breaks this circuit when the pointer and index mark resume their position of coincidence, the breaking of the circuit causing the electro-magnetic clutch to assume its inoperative position and also causing an electromagnetic brake to stop the clutch spindle (but not the motor) from further operation. The motor may at the same time be stopped if desired to save waste of current but as it is entirely disconnected from the sight when the pointer and index mark are in coincidence, it can be kept running continuously without altering the action obtained. A single motor is preferably employed for effecting both the range and deflection setting of the sight but if desired two separate motors may be employed.

In order that the said invention may be clearly understood and readily carried into effect, we will describe the same more fully with reference to the accompanying drawings, in which:—

Figure 1 is a diagram showing the electrical connections of a system of sight setting apparatus constructed in accordance with our invention.

Fig. 1ª is a diagram showing a portion only of the electrical connections of Fig. 1.

Fig. 2 shows the sight setting apparatus applied to a gun mounting.

Figs. 3, 4 and 5, are views of details hereinafter referred to.

Figs. 6 and 7 are respectively a sectional side elevation and a sectional plan of the clutch mechanism and brakes, Fig. 6 being taken approximately on the line 1, 1 of Fig. 7, and the latter figure being taken approximately on the line 2, 2 of Fig. 6, and Fig. 8 is a diagram showing more clearly the arrangement of gear wheels of Fig. 7.

Referring to Fig. 2, A is the range dial, A' is its pointer capable of being actuated from a distant station and A² is the index mark. B is the deflection dial B' is its pointer capable of being actuated from a distance and B² is the index mark. C (Figs. 1 and 2) represents the motor which in the example shown is adapted to set the sight both for range and deflection.

The apparatus that controls the movements of the sight for range and deflection comprises in the example illustrated four main portions, viz., two hunting switches (Figs. 3 to 5) which become operative, when the pointers A', B', and the index marks A², B² are not in coincidence, a make and break switch $c'$ (Fig. 1) which stops the motor C when the pointers and index marks are in coincidence and starts it when these parts move out of coincidence, magnetic brakes $a$, $a^x$ which come into operation when the motor circuit is broken, and magnetic clutches $a'$, $a^2$ $a'^x$, $a^{2x}$ which become operative alternately in accordance with the direction of movement of the pointers.

Figs. 3, 4 and 5 show a convenient form of the range hunting switch used in conjunction with the pointer A' and the index mark $A^2$. The switch comprises a disk D which is coupled directly to the pointer spindle $A^x$ and is formed on its circumference with a notch $d$ which engages with a "trip-piece" D' when the index mark and the pointer are coincident. This trip-piece may be controlled by two flat springs $d'$ $d'$ which tend to set it in line with the center of the notched disk. The said trip-piece is rigidly mounted on a spindle $d^2$ carried by a frame $D^2$ capable of angular displacement to effect the necessary calibration corrections during the setting of the sight for range, the angular position of the frame being determined by the adjustment given to the index mark to which it may be directly coupled by an arm $D^3$. The spindle $d^2$ also carries a member $D^4$ having two curved arms $d^4$, $d^4$, which bear against springs $d^3$, $d^3$; these springs are provided with contacts $d^{3x}$, $d^{3x}$ and their upper ends are curved inward as shown so that when the member $D^4$ is rocked by the trip piece D', one or the other of the springs $d^3$ will be displaced to cause one of the contacts $d^{3x}$, $d^{3x}$ thereon to engage with one of two contacts $d^{4x}$, $d^{5x}$ fixed to the frame $D^2$. By these means a small relative movement between the trip piece D' and the disk D (and therefore between the index mark and the pointer) causes one of the contacts $d^{3x}$ to engage with its corresponding fixed contact. It will be clear that only when the index mark and the pointer are in coincidence will the trip piece D' engage with its notch, this engagement resulting in the parts $d^{3x}$, $d^{3x}$ being moved out of contact with the parts $d^{4x}$, $d^{5x}$ and giving a quick break. The hunting switch for the deflection gear may be similar to that above described except that the frame $D^2$ would not be adjustably mounted.

The two movable contacts $d^{3x}$, $d^{3x}$ may be electrically connected to a common terminal 2 (Figs. 1 and 1a) in the case of the range hunting gear, or to a common terminal 5 (Fig. 1) in the case of the deflection hunting gear. The fixed contacts $d^{4x}$, $d^{5x}$ may be connected to terminals 1 and 3 or terminals 4 and 6 (Fig. 1) in accordance with whether the hunting switch appertains to the range or the deflection setting mechanism.

Referring more particularly to Fig. 1a which shows the circuits in relation only to the terminals 1 and 2 of the range hunting gear, the terminal 2 is connected by a conductor 7 with a magnet or solenoid E which in turn is connected by conductors 8 and 9 with a solenoid C' operating the aforesaid make and break switch $c'$, this solenoid being also connected by a conductor 10 with the positive main. The terminal 1 is electrically connected through a conductor 11 to the magnetic clutch $a'$, which serves to couple the motor to the range setting mechanism and this magnetic clutch is in turn connected by a conductor 12 with the negative main. The magnetic clutch is also electrically connected by a conductor 13 to the magnetic brake $a$ which in turn is connected by conductors 14 and 15 to a contact point 16 arranged contiguous to a switch arm $e$ of the magnet or solenoid E. This switch arm is permanently connected by a conductor 17 with the positive main. Thus when the terminals 1 and 2 are electrically connected as a result of the rocking in one direction of the aforesaid trip-piece D', current passes from the positive pole through the conductor 10, the solenoid C', the conductors 9 and 8, the magnet or solenoid E and the conductor 7 to the terminal 2; the current then passes to the terminal 1 and thence through the conductor 11, the magnetic clutch $a'$ and the conductor 12 to the negative pole. The energization of the solenoid C' causes the switch $c'$ to close the circuit of the motor C thereby starting the latter and the passing of the current through the magnetic clutch $a'$ causes the movement of the motor C to be transmitted in the predetermined direction to the range setting mechanism.

Before the terminals 1 and 2 were electrically connected as above mentioned, the switch arm $e$ was in contact with the point 16 with the result that current passed from the positive pole through the conductor 17, the switch arm $e$, the conductors 15 and 14 the magnetic brake $a$ and the conductors 13 and 12 to the negative pole, the brake being therefore in operation. When however the magnet or solenoid E becomes energized by the connection of the terminals 1 and 2 the switch arm $e$ is moved and breaks the circuit through the magnetic brake $a$ which therefore is no longer in operation.

When the electrical connection between the terminals 1 and 2 becomes broken the solenoid C', the magnet clutch $a'$ and the magnet or solenoid E are deënergized with the result that the motor C is stopped and is also de-clutched from the range setting mechanism and that the magnetic brake $a$ is again brought into operation.

A similar operation to that above described with reference to Fig. 1a also takes place when the terminals 2, 3 (Fig. 1) are electrically connected except that the magnetic clutch $a^2$ is brought into operation to cause the range setting mechanism to be actuated by the motor C in the reverse direction to that indicated above. The circuits for the deflection hunting gear are similar to those above described and contain parts $E^x$, $e^x$, $a^x$, $a'^x$ and $a^{2x}$ similar to the corresponding parts E, e, a, a', and $a^2$ in the circuits of the range hunting gear; the solenoid C' is common to both these circuits. It will be understood that the range and deflection setting operations can be performed simultaneously.

The magnetic clutch mechanism may comprise a central shaft $C^0$ (Figs. 2, 7 and 8) which is coupled to the motor C directly or by gearing. This central shaft carries gear wheels $c^2$, $c^3$ meshing with gearing which drives in opposite directions sleeves $C^2$, $C^3$ forming part of external members $C^4$, $C^5$ of magnetic clutches which are designated by the reference letters $a'$, $a'^x$, $a^2$ and $a^{2x}$ in Fig. 1. These external members are rotatably mounted on secondary shafts $A^0$, $B^0$ (see also Fig. 2) serving to actuate the range and deflection setting mechanism respectively. The secondary shafts carry the internal members $C^{4x}$, $C^{5x}$ of the magnetic clutches; these members are capable of short longitudinal movement on the secondary shafts which they drive through featherkeys. The motor may be carried on a part of the mounting that moves in training only and may be connected through the aforesaid secondary shafts $A^0$ $B^0$ and universal joints to telescopic shafts $a^0$ $b^0$ which operate upon the range and deflection setting mechanisms as shown in Fig. 2. The shafts $a^0$ and $b^0$ are made to telescope by forming the lower parts with a square hole and constructing the upper parts of rods of square cross section. The magnetic clutch mechanism is carried in a casing $C^x$. The aforesaid gearing interposed between the gear wheels $c^2$, $c^3$ is composed of two systems, a direct drive system and a reverse drive system. The former system comprises two idle wheels $c^4$ (see Fig. 8) gearing with the wheel $c^3$ and with wheels $c^5$, $c^5$ on the sleeves $C^2$, $C^2$, and the reverse drive system comprises two gear wheels $c^6$, $c^6$ on the sleeves $C^3$, $C^3$ these wheels gearing with the wheel $c^2$. Thus the movement transmitted from the shaft $C^0$ to the sleeves $C^2$ $C^2$ is opposite to that transmitted to the sleeves $C^3$, $C^3$.

By reason of these magnetic clutch drives the possibility of over-running the setting position, and the disadvantages resulting from suddenly reversing the motor, are obviated; furthermore the moving parts of the clutch mechanism that are connected to the sighting apparatus consist of light pieces which can be brought to rest or reversed without difficulty.

The magnetic brakes $a$, $a^x$ are arranged within the casing $C^x$ carrying the clutch mechanism and the said secondary shafts $A^0$, $B^0$ carry soft iron disks $a^3$, $a^{3x}$ as shown in Fig. 6, capable of sliding along featherkeys on the said shafts to apply and release the brakes each of the disks constituting one element of each brake. The other elements of the brakes are constituted by the fixed parts $a^4$, $a^{4x}$. Thus, when one of the movable elements $a^3$, $a^{3x}$ of the brakes is forced against the fixed element ($a^4$ or $a^{4x}$) the rotation of the shaft $A^0$ or $B^0$ is stopped. The magnetic clutches and the brake magnets are all provided with fixed coils, and there are no rubbing contacts, the wires from the coils being carried directly to a terminal board conveniently arranged on the side of the casing.

It will be understood that no relays are necessary in our improved system, and the existing follow-the-pointer gear is not necessarily interfered with; furthermore, the weight of the sight is maintained at a minimum and the gear is adaptable to practically any design of sight.

The usual range and deflection setting handles are employed and clutches may be provided to disconnect the sight setting mechanisms from the aforesaid motor when it is desired to manually actuate the said handles.

What we claim and desire to secure by Letters Patent of the United States is:—

1. In electrical receiving apparatus, the combination of an angularly displaceable pointer operated from a distant station, an angularly displaceable index mark with which said pointer is normally coincident, a switch member, means for moving this member to complete a circuit when the pointer and index mark are no longer in coincidence and to keep this circuit closed until the pointer and index mark resume their position of coincidence while permitting relative movements between the pointer and index mark greater than that necessary to merely complete the circuit, a motor running in one direction only, clutch mechanism interposed between said motor and the mechanism to be controlled and an electro-magnetic contrivance arranged in said circuit for operating said clutch mechanism.

2. In electrical receiving apparatus, the combination of an angularly displaceable pointer operated from a distant station, an angularly displaceable index mark with which said pointer is normally coincident, a switch member which is moved to complete a circuit when the pointer and index mark are no longer in coincidence and to keep this circuit closed until the pointer and index mark resume their position of coincidence while permitting relative movement between the pointer and index mark greater than that necessary to merely complete the circuit, a motor running in one direction only, clutch mechanism interposed between said motor and the mechanism to be controlled, an electro-magnetic contrivance arranged in said circuit for operating said clutch mechanism, an electro-magnetic brake and means for automatically causing said brake to stop the mechanism to be controlled when the aforesaid circuit is broken.

3. In apparatus for controlling mechanism from a distance, the combination with a traveling pointer operated from a distant station and an index mark with which said pointer is normally coincident, of a notched member moving with said pointer, a switch member, a projection on the switch member for engaging with the notch in the notched member, said switch member serving when the pointer is moved out of coincidence with the index mark to close and keep closed one or other of two electrical circuits until the pointer and index mark resume their position of coincidence, a motor running in one direction only, clutch mechanism interposed between said motor and the mechanism to be controlled, and an electro-magnetic contrivance arranged in said circuit for operating said clutch mechanism.

4. The combination of a traveling pointer operated from a distant station, an index mark with which said pointer is normally coincident, a notched member moving with said pointer, a switch member, a projection on the switch member for engaging with the notch in the notched member, said switch member serving when the pointer is moved out of coincidence with the index mark to close and keep closed one or other of two electrical circuits until the pointer and index mark resume their position of coincidence, a motor running in one direction only, clutch mechanism interposed between said motor and the mechanism to be controlled, an electro-magnetic contrivance arranged in said circuit for operating said clutch mechanism, a brake and means for causing said brake to stop the mechanism to be controlled when the aforesaid circuit is broken.

5. The combination with range and deflection setting mechanism, of a motor running in one direction only and means controlled from a distance for enabling said motor to actuate both the range setting and the deflection setting mechanism.

6. The combination with range and deflection setting mechanism of a range pointer operated from a distant station, an index mark with which said pointer is normally coincident, a deflection pointer operated from a distant station, an index mark with which said pointer is normally coincident, a motor running in one direction only, clutch mechanism, and means for moving said clutch mechanism to clutch the motor to the range and deflection setting mechanism when the pointers move out of coincidence with their index marks and to declutch said motor when the pointers and index marks resume their positions of coincidence.

7. The combination with range and deflection setting mechanism, of a range pointer operated from a distant station, an index mark with which said pointer is normally coincident, a deflection pointer operated from a distant station, an index mark with which said pointer is normally coincident, a motor running in one direction only, clutch mechanism, means for moving said clutch mechanism to clutch the motor to the range and deflection setting mechanism when the pointers move out of coincidence with their index marks and to declutch said motor when the pointers and index marks resume their positions of coincidence, brake mechanism, and means for causing said brake mechanism to stop the movements of the range and deflection setting mechanism when the pointers and index marks resume their positions of coincidence.

In testimony whereof we affix our signatures in the presence of two witnesses.

ARTHUR TREVOR DAWSON.
GEORGE THOMAS BUCKHAM.

Witnesses:
HENRY KING,
JNO. R. CASWELL.